US009292447B2

(12) United States Patent
Roy et al.

(10) Patent No.: US 9,292,447 B2
(45) Date of Patent: Mar. 22, 2016

(54) DATA CACHE PREFETCH CONTROLLER

(71) Applicants: Sourav Roy, Kolkata (IN); Vikas Ahuja, Delhi (IN); Shourjo Banerjee, Gurgaon (IN)

(72) Inventors: Sourav Roy, Kolkata (IN); Vikas Ahuja, Delhi (IN); Shourjo Banerjee, Gurgaon (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 158 days.

(21) Appl. No.: 14/185,899

(22) Filed: Feb. 20, 2014

(65) Prior Publication Data

US 2015/0234745 A1 Aug. 20, 2015

(51) Int. Cl.
*G06F 12/08* (2006.01)

(52) U.S. Cl.
CPC ........ *G06F 12/0862* (2013.01); *G06F 12/0875* (2013.01); *G06F 2212/452* (2013.01); *G06F 2212/6028* (2013.01); *Y02B 60/1225* (2013.01)

(58) Field of Classification Search
CPC .................................................... G06F 12/0862
See application file for complete search history.

(56) References Cited

U.S. PATENT DOCUMENTS 6,430,680 B1 8/2002 Burky
7,831,800 B2 11/2010 Kocev
7,917,702 B2 3/2011 Morrow
2007/0204267 A1 8/2007 Cole
2009/0019229 A1* 1/2009 Morrow .............. G06F 12/0862 711/137
2011/0072218 A1* 3/2011 Manne .................. G06F 12/123 711/136
2012/0066455 A1 3/2012 Punyamurtula
2013/0013867 A1* 1/2013 Manne ................ G06F 12/0862 711/137
2013/0346703 A1* 12/2013 McCauley .......... G06F 12/0862 711/137

OTHER PUBLICATIONS

Vanderwiel, Steven P. and Lilja David J., "Data Prefetch Mechanisms", ACM Computing Surveys (CSUR). vol. 32, No. 2, Jun. 2000.
Chen, Tien-Fu and Baer, Jean-Lopu, "Effective Hardware-Based Data Prefetching for High Performance Processors", IEEE Transactions on Computers, vol. 44, No. 5, May 1995.

* cited by examiner

*Primary Examiner* — Kevin Verbrugge
*Assistant Examiner* — Zubair Ahmed
(74) *Attorney, Agent, or Firm* — Charles E. Bergere

(57) ABSTRACT

A processor includes a processing unit, a memory, a data cache, an One Block Look-ahead (OBL) prefetch engine, a Stride-Allocate on Miss (AoM) prefetch engine and a prefetch back-off module. The prefetch back-off module assigns and sets a status bits to a prefetched cache line and resets the status bit when the cache line is used by the processing unit. The back-off module also decrements a count value when at least two cache lines are used consecutively by the processing unit, increments the count value when at least two unused cache lines are evicted consecutively from the data cache, and disables cache line prefetching when the count value is greater than zero. The stride-AoM prefetch engine includes a reference pattern table (RPT) that stores details of only those instructions that have undergone a cache miss.

15 Claims, 3 Drawing Sheets

START
ASSIGN STATUS BIT TO NEW PREFETCHED CACHE LINE IN DATA CACHE AND SET STATUS BIT — 302
RESET STATUS BIT OF CACHE LINE WHEN CACHE LINE IS USED BY PROCESSOR FOR EXECUTING INSTRUCTIONS — 304
IDENTIFY PREFETCHED CACHE LINE USED BY PROCESSOR FOR EXECUTING CORRESPONDING INSTRUCTIONS — 306
IDENTIFY UNUSED PREFETCHED CACHE LINE EVICTED FROM DATA CACHE — 308
DECREMENT COUNT WHEN AT LEAST TWO PREFETCHED CACHE LINES ARE USED CONSECUTIVELY BY THE PROCESSOR — 310
INCREMENT COUNT WHEN AT LEAST TWO UNUSED PREFETCHED CACHE LINES ARE EVICTED CONSECUTIVELY FROM THE DATA CACHE — 312
DISABLE PREFETCHING OF CACHE LINE TO DATA CACHE WHEN COUNT IS GREATER THAN ZERO — 314
STOP

DATA CACHE PREFETCH CONTROLLER

BACKGROUND OF THE INVENTION

The present invention relates generally to processors, and more particularly, to a data cache prefetch controller in a multi-processing unit system.

A processor may include one or more processing units that execute instructions, a memory that stores data required for executing the instructions, and a data cache that temporarily stores the instruction data in the form of cache lines. Example processing units include an arithmetic logic unit (ALU), a branch unit, and a load store unit. Typically, the processor uses a prefetch engine to predict which future memory addresses will be accessed, and prefetch the data at these addresses from the memory for storage in the data cache. Example prefetch engines include a one-block look ahead (OBL) prefetch engine and a stride-based prefetch engine.

A conventional OBL prefetch engine prefetches data at a memory address subsequent to a current memory address when a cache miss has occurred for the current memory address. A cache hit occurs when the processing unit uses a cache line of the data cache to execute an instruction, a cache evict occurs when a cache line is evicted from the data cache, and a cache miss occurs when the processing unit does not find the data needed to execute an instruction in the data cache.

A conventional stride-based prefetch engine includes a reference pattern table (RPT) for storing the details of instructions executed by the processing unit and predicting memory addresses based on patterns of previous memory addresses accessed by the instructions. The RPT holds information for the most recently used instructions to predict memory access patterns. However, the RPT used by the conventional stride-based prefetch engine is fairly large in size as it includes details of all the recent instructions executed by the processing unit, so it occupies a large area of the processor and consumes a large amount of power.

Further, a common problem associated with both the OBL and stride-based prefetch engines is prefetching of unwanted data, which leads to more cache evicts than cache hits. The prefetching of unwanted data increases the on-chip traffic in the processor and leads to under-utilization of the data cache. A conventional solution to tackle the above-mentioned problem includes using large look-up tables to identify unwanted cache lines (cache data). However, using such tables also increases the area and power overhead of the processor.

Therefore, it would be advantageous to have a prefetch controller that reduces prefetching of unwanted data, reduces on-chip traffic and power consumption, improves speed and performance of the processor, and generally overcomes the above-mentioned limitations of existing prefetch engines.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements. It is to be understood that the drawings are not to scale and have been simplified for ease of understanding the invention.

DETAILED DESCRIPTION OF THE PRESENT INVENTION

Figure 1:
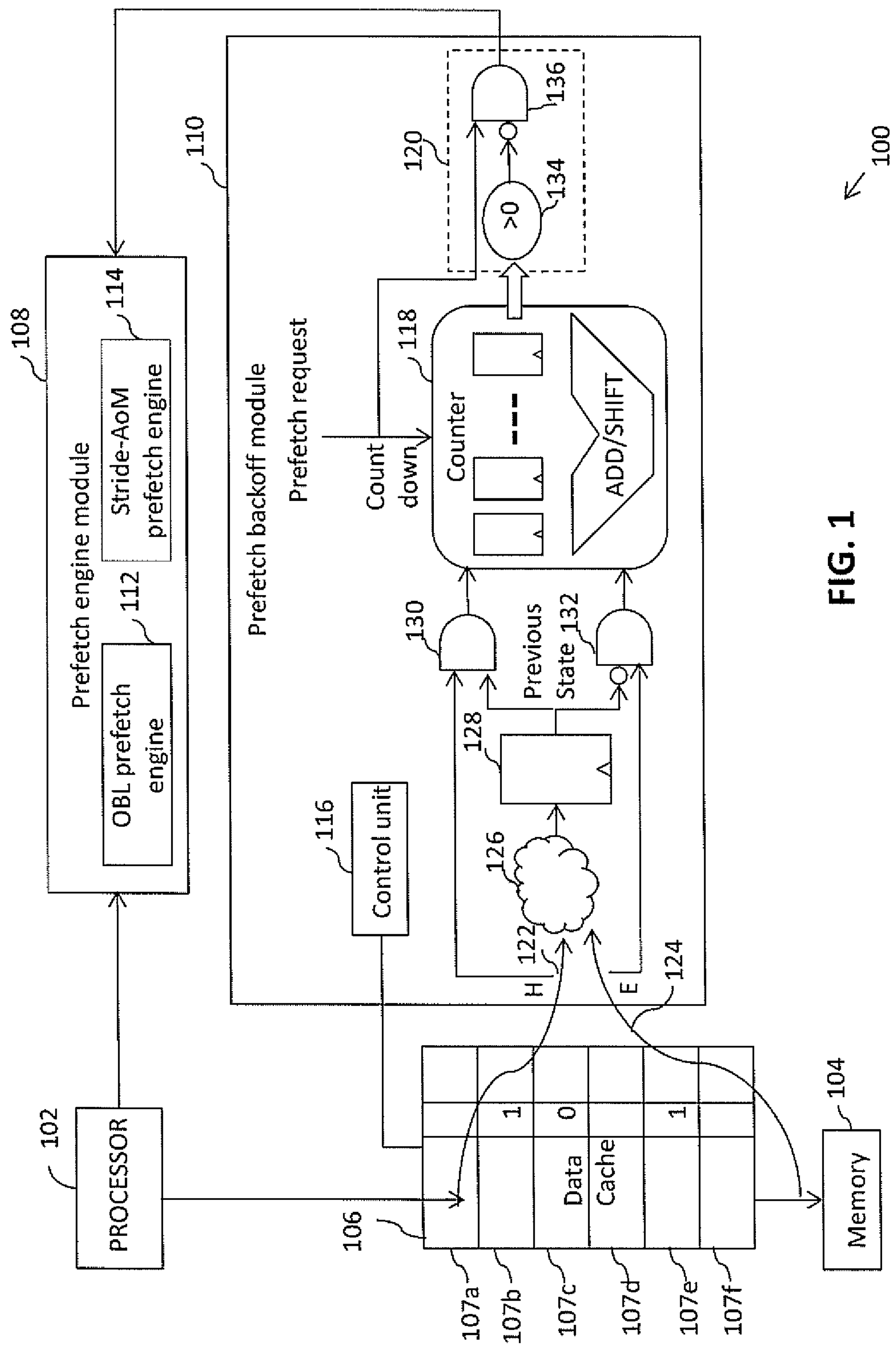
FIG. 1 is a schematic block diagram of a processor in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a processor is provided. The processor includes a processing unit for executing a plurality of instructions, at least one memory connected to the processing unit for storing data required for executing the plurality of instructions, a data cache, connected to the processing unit and the at least one memory, for temporarily storing the data required for executing the plurality of instructions in the form of a plurality of cache lines. Each cache line includes a memory address and corresponding data prefetched from the at least one memory into the data cache. The processor further includes a prefetch engine module connected to the processing unit and data cache for prefetching the memory address and corresponding data of the each cache line into the data cache. A prefetch back-off module is connected to the data cache and the prefetch engine module. The prefetch back-off module includes a control unit, a counter, and a prefetch disabling module that is connected to the counter. The control unit assigns a status bit to a cache line that is newly prefetched into the data cache by the prefetch engine module, sets the status bit, and resets the status bit of the cache line when the cache line is used by the processing unit for executing corresponding plurality of instructions. The control unit further identifies at least one prefetched cache line of the plurality of cache lines that is used by the processing unit for executing corresponding plurality of instructions, and identifies at least one unused prefetched cache line of the plurality of cache lines that is evicted from the data cache. The counter decrements a count value when the control unit identifies at least two prefetched cache lines of the plurality of cache lines that are consecutively used by the processing unit, and increments the count value when the control unit identifies at least two unused prefetched cache lines of the plurality of cache lines that are consecutively evicted from the data cache. The prefetch disabling module disables prefetching of a subsequent cache line into the data cache when the count value is greater than zero.

In another embodiment of the present invention, a method for controlling prefetching of cache lines into a data cache of a processor is provided. The processor includes a processing unit that executes a plurality of instructions, at least one memory that stores data required for executing the plurality of instructions, the data cache that temporarily stores the data required for executing the plurality of instructions in form of a plurality of cache lines, a prefetch engine module and a prefetch back-off module. A status bit is assigned to a cache line newly prefetched into the data cache by the prefetch engine module. The status bit of the cache line is set and then reset when the cache line is used by the processing unit for executing corresponding plurality of instructions. At least one prefetched cache line of the plurality of cache lines that is used by the processing unit for executing corresponding plurality of instructions is identified. Thereafter, at least one unused prefetched cache line of the plurality of cache lines that is evicted from the data cache is identified. A count value is decremented when at least two prefetched cache lines of the plurality of cache lines are consecutively used by the processing unit and incremented when at least two unused prefetched cache lines of the plurality of cache lines are consecutively evicted from the data cache. Further, prefetching of a subsequent cache line into the data cache is disabled when the count value is greater than zero.

In yet another embodiment of the present invention, a processor is provided. The processor includes a processing unit for executing a plurality of instructions, at least one memory connected to the processing unit for storing data required for executing the plurality of instructions, a data cache, connected to the processing unit and the at least one memory, for temporarily storing the data required for executing the plurality of instructions in the form of a plurality of cache lines. Each cache line includes a memory address and corresponding data prefetched from the at least one memory into the data cache. The processor further includes a one-block look ahead (OBL) prefetch engine, a stride-allocate on Miss (AoM) prefetch engine, and a prefetch back-off module. The OBL prefetch engine prefetches data corresponding to a memory address subsequent to a current memory address when a cache miss has occurred for the current memory address. The stride-AoM prefetch engine includes a reference pattern table (RPT) for storing one or more details of at least one instruction of the plurality of instructions that encounters a cache miss and predicting at least one memory address to be prefetched based on the one or more details of the at least one instruction. The stride-AoM prefetch engine further includes an RPT controller for allocating the at least one instruction in the RPT that encounters the cache miss, and updating the RPT at each instruction of the plurality of instructions. The prefetch back-off module is connected to the data cache, the OBL prefetch engine and the stride-AoM prefetch engine. The prefetch back-off module includes a control unit, a counter and a prefetch disabling module connected to the counter. The control unit assigns a status bit to a cache line that is newly prefetched into the data cache by the prefetch engine module, sets the status bit, and resets the status bit of the cache line when the cache line is used by the processing unit for executing corresponding plurality of instructions. The control unit further identifies at least one prefetched cache line of the plurality of cache lines that is used by the processing unit for executing corresponding plurality of instructions, and identifies at least one unused prefetched cache line of the plurality of cache lines that is evicted from the data cache. The counter decrements a count value when the control unit identifies at least two prefetched cache lines of the plurality of cache lines that are consecutively used by the processing unit, and increments the count value when the control unit identifies at least two unused prefetched cache lines of the plurality of cache lines that are consecutively evicted from the data cache. The prefetch disabling module disables prefetching of a subsequent cache line into the data cache when the count value is greater than zero.

Various embodiments of the present invention provide a processor that includes a processing unit, a memory, a data cache, a prefetch engine module, and a prefetch back-off module. The prefetch engine module includes an OBL prefetch engine and a stride-allocate on miss (AoM) prefetch engine. The stride-AoM prefetch engine includes a reference pattern table (RPT) controller that allocates only those instructions in the RPT that encounter a cache miss but updates the RPT for each instruction, thus significantly reducing the size of the RPT. The prefetch back-off module is connected to the prefetch engine module and the data cache, and includes a control unit, a counter, and a prefetch disabling module connected to the counter. The control unit assigns a status bit to a cache line newly prefetched into the data cache, sets the status bit, and resets the status bit of the cache line when the cache line is used by the processing unit. The counter decrements a count value of the counter when at least two prefetched cache lines are consecutively used by the processing unit, and increments the count value when at least two unused prefetched cache lines are consecutively evicted from the data cache. The prefetch disabling module disables prefetching of at least one cache line into the data cache when the count value is greater than zero. The disabling of prefetching of new cache lines into the data cache when cache evicts of unused cache lines are more than cache hits reduces unwanted prefetches and on-chip traffic of the processor. The prefetch back-off module and the stride-AoM prefetch engine reduces prefetching of unwanted cache lines into the data cache, thereby reducing on-chip traffic and power consumption, and improving speed and performance of the processor.

Referring now to FIG. 1, a schematic block diagram of a processor 100, in which an embodiment of the present invention is implemented, is shown. The processor 100 includes a processing unit 102, a memory 104, a data cache 106, a prefetch engine module 108, and a prefetch back-off module 110. In an embodiment of the present invention, the processing unit 102, the memory 104, the data cache 106, the prefetch engine module 108, and the prefetch back-off module 110 are interconnected by way of a bus (not shown).

The processing unit 102 includes at least one of an arithmetic logic unit (ALU), a branch unit and a load store unit, and executes a plurality of instructions such as branch instructions, load and store instructions, and arithmetic and logic instructions. The memory 104 stores data required for executing these instructions. The memory 104 may be a main memory or an external memory, and examples of the memory 104 include a random access memory (RAM), a dynamic RAM (DRAM), a synchronous DRAM (SDRAM) and a double, data-rate SDRAM (DDR SDRAM).

The data cache 106 temporarily stores the data required for executing the plurality of instructions in the form of a plurality of cache lines 107*a*-107*f* (collectively referred to as cache lines 107). Each cache line 107 includes an address of the memory 104 (hereinafter referred to as memory address), and corresponding data.

The prefetch engine module 108 prefetches at least one memory address and corresponding data from the memory 104 into the data cache 106 based on one or more prefetch schemes. In an embodiment, the prefetch engine module 108 includes a one block look ahead (OBL) prefetch engine 112 and a stride-allocate on miss (AoM) prefetch engine 114 for prefetching at least one memory address and corresponding data from the memory 104 into the data cache 106.

The OBL prefetch engine 112 prefetches data corresponding to a memory address subsequent to a current memory address, when a cache miss has occurred for the current memory address. The stride-AoM prefetch engine 114 includes a reference pattern table (RPT) that stores details of instructions that have undergone a cache miss and predicts memory addresses for data prefetching based on the patterns of the previous memory addresses accessed by the instructions.

The prefetch back-off module 110 includes a control unit 116, a counter 118, and a prefetch disabling module 120. The control unit 116 assigns a status bit to a cache line 107 when it is newly prefetched into the data cache 106, sets the status bit, and resets the status bit when the cache line 107 is used by the processing unit 102. In an example, the control unit 116 assigns the status bit '1' to cache line 107*b* when it is newly prefetched into the data cache 106, and resets the status bit to '0' when the cache line 107*b* encounters a cache hit, i.e., when the processing unit 102 accesses the cache line 107*b* during a memory read/write operation for executing the corresponding instructions.

Based on the status bit of the cache lines 107, the control unit 116 determines occurrence of cache hits and cache evicts in the data cache 106. In an example, a cache hit occurs for a cache line 107*c* when the status bit of the cache line 107*c* is changed from 1 to 0, and a cache evict occurs for a cache line 107*e* when the cache line 107*e* has a status bit '1' during eviction from the data cache 106.

The control unit 116 further generates cache hit and evict signals 122 and 124 whose current logic states indicate occurrence of cache hit or cache evict in the data cache 106. In an example, the logic high and low states of cache hit and evict signals at time t=0 respectively, indicate occurrence of a cache hit 'H' in the data cache 106. Further, the logic low and high states of the cache hit and evict signals at time t=1 respectively, indicate occurrence of a cache evict 'E' in the data cache 106.

The prefetch back-off module 110 further includes a state machine 126 for registering current logic states of the cache hit and evict signals 122 and 124, and a flip-flop 128 having an input terminal for receiving the current logic states of the cache hit and evict signals 122 and 124, and an output terminal for generating the previous logic states of the cache hit and evict signals 122 and 124. The prefetch back-off module 110 further includes a first AND gate 130 having first and second input terminals for receiving current and previous logic states of the cache hit signal 122, and an output terminal for generating a logic high count-down signal in the event of two consecutive cache hits, and a second AND gate 132 having first and second input terminals for receiving current and previous logic states of the cache evict signal 124 respectively, and an output terminal for generating a logic low count-up signal in the event of two consecutive cache evicts from the data cache 106.

The counter 118 decrements a count value on receiving a logic high count-down signal from the first AND gate 130 and increments the count value on receiving a logic low count-up signal from the second AND gate 132. The counter 118 further decrements the count value when a prefetch request is generated upon occurrence of a cache miss in the data cache 106.

In an embodiment of the present invention, the counter 118 may be implemented using a plurality of flip-flops and an adder and/or a shifter. A scaling function of the counter 118 is determined based on the specifications of the memory 104, the data cache 106 and the prefetch engine module 108.

The prefetch disabling module 120 disables the prefetching of at least one cache line into the data cache 106 when the count value is greater than zero. In an embodiment, the prefetch disabling module 120 includes a logic circuit 134 that generates a logic high signal when the count value is greater than zero, and vice versa. In an example, the logic circuit 134 may be implemented using at least one of AND gate, OR gate, NOT gate, NOR gate and XOR gate. The prefetch disabling module 120 further includes a third AND gate 136 having a first input terminal for receiving the logic high prefetch request signal, an inverted second input terminal for receiving an output of the logic circuit 134, and an output terminal for generating a logic low signal when the count value is greater than zero. The logic low output of the third AND gate 132 blocks the prefetch request and disables the prefetch engine module 108 to prefetch memory address and data into the data cache 106. As soon as the count values become less than or equal to zero, the third AND gate 132 generates a logic high signal and enable the prefetch engine module 108 to prefetch memory address and data into the data cache 106.

Thus, when back-to-back eviction of unused cache lines 107 is greater than back-to-back cache hits in the data cache 106, the prefetch engine module 108 is temporarily disabled to utilize the unused cache lines 107 and reduce prefetching of unwanted cache lines.

Figure 2:
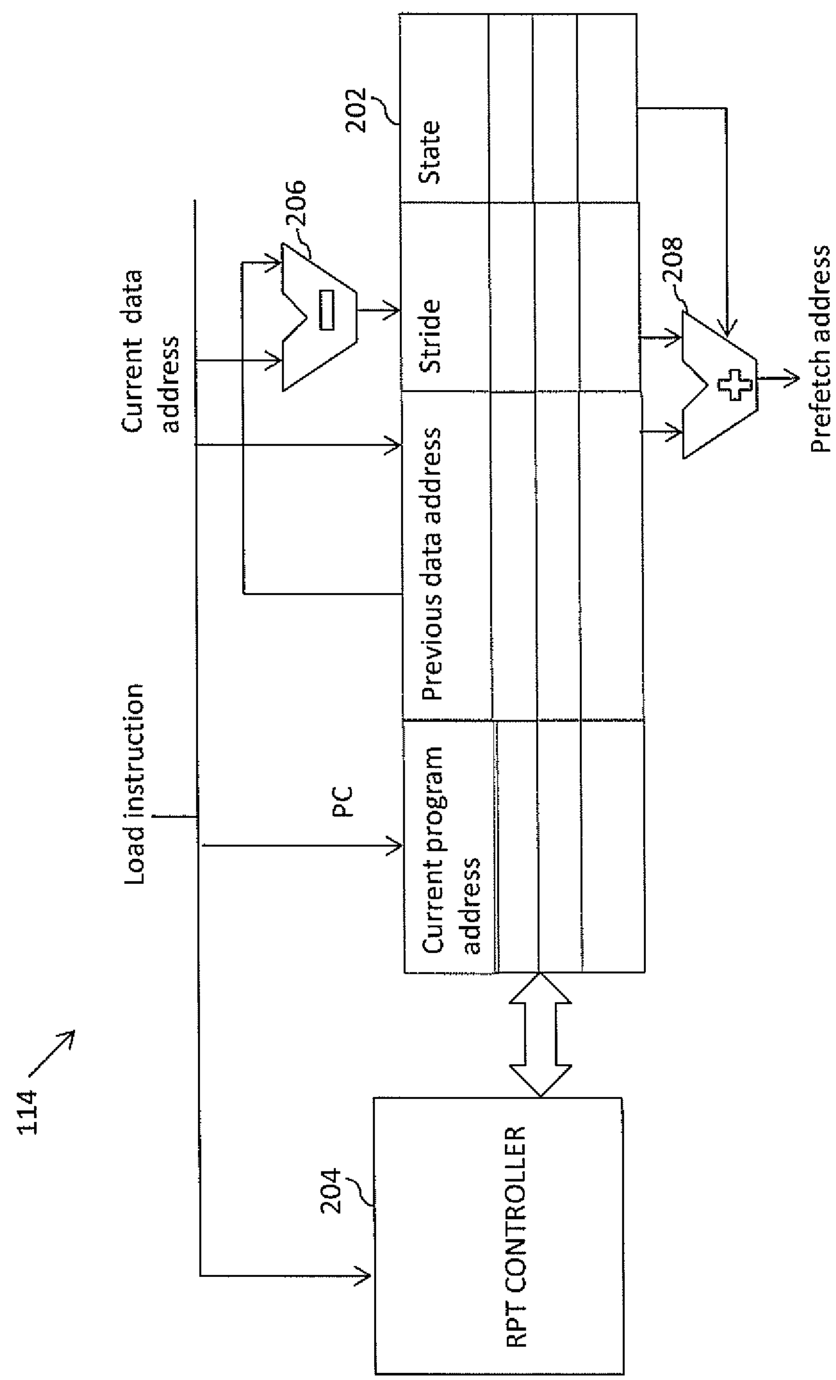
FIG. 2 is a schematic block diagram of a stride-allocate on miss (AoM) prefetch engine in accordance with an embodiment of the present invention.

FIG. 2 is a schematic block diagram of a stride-AoM prefetch engine 114, in accordance with an embodiment of the present invention. The stride-AoM prefetch engine 114 includes a reference pattern table (RPT) 202, an RPT controller 204, a subtractor 206 and an adder 208.

The RPT 202 stores a current program address, i.e., a memory address of an instruction, current and previous data addresses, i.e., previous and current memory addresses of corresponding data, a stride value and a state field for at least one instruction that encounters a cache miss in the data cache 106. In other words, the RPT controller 204 allocates only those load instructions in the RPT 202 that encounter a cache miss, but updates the RPT 202 for each instruction executed by the processing unit 102.

The subtractor 206 generates a stride value by obtaining a difference of current and previous data addresses corresponding to a current program address. The adder 208 adds the stride value to a corresponding previous data address to predict a prefetch address. The prefetch address may then be used to prefetch corresponding data into the data cache 106.

The size of the RPT 202 is significantly reduced by allocating only those instructions that encounter a cache miss instead of allocating all the recent instructions executed by the processing unit 102.

Figure 3:
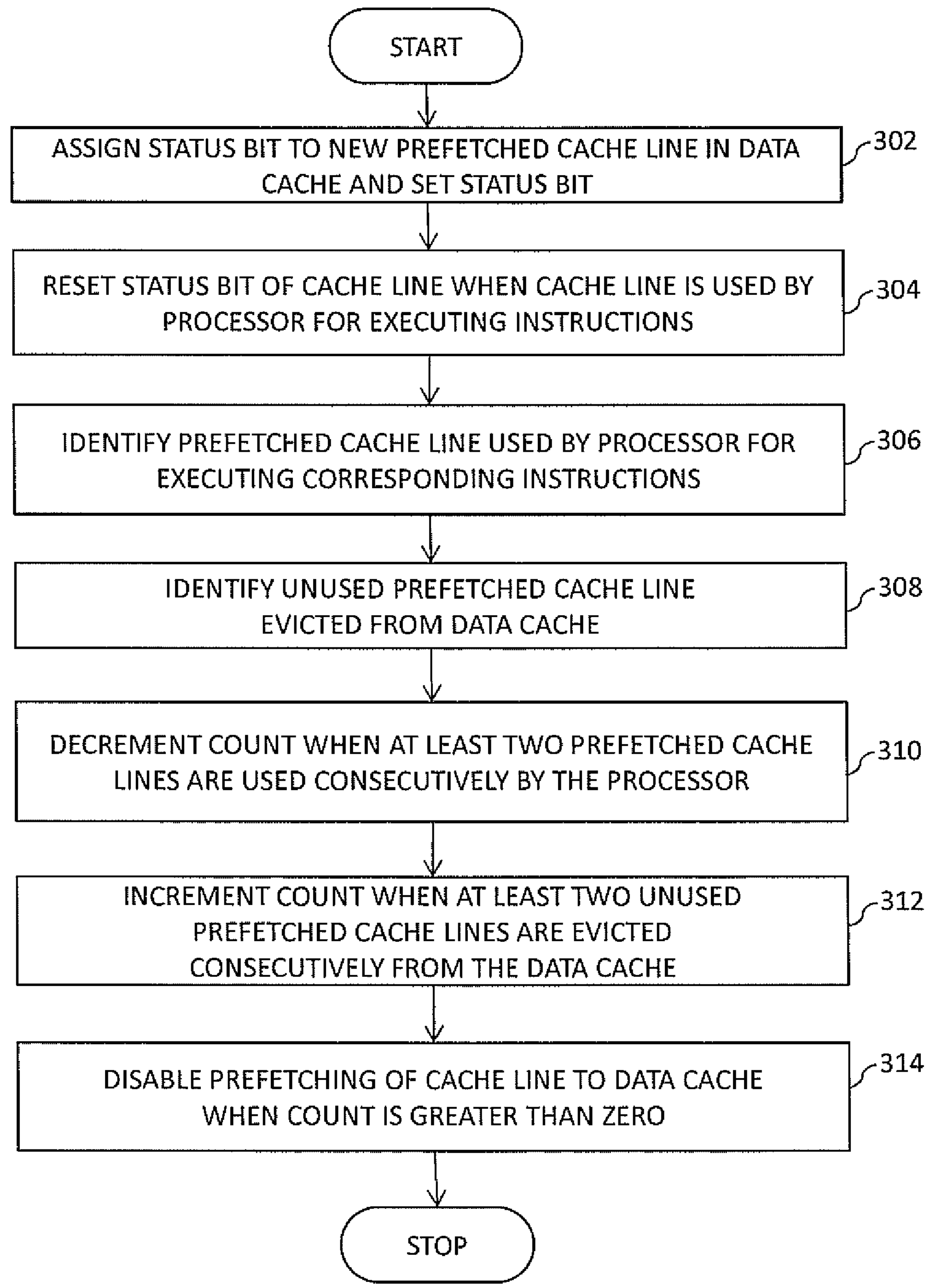
FIG. 3 is a flow chart illustrating a method for controlling cache line prefetching into a data cache in accordance with an embodiment of the present invention.

Referring now to FIG. 3, a flow chart illustrating a method for controlling prefetching of cache lines into the data cache 106, in accordance with an embodiment of the present invention is shown. At step 302, the control unit 116 assigns a status bit to a cache line 107 that is newly prefetched into the data cache 106 by the prefetch engine module 108 and sets the status bit. At step 304, the control unit 116 resets the status bit of the cache line 107 when the cache line 107 is used by the processing unit 102 for executing corresponding plurality of instructions.

At step 306, the control unit 116 identifies at least one prefetched cache line 107 that is used by the processing unit 102 for executing corresponding plurality of instructions. At step 308, the control unit 116 identifies at least one unused prefetched cache line 107 that is evicted from the data cache 106. At step 310, a count value of the counter 118 is decremented when at least two prefetched cache lines 107 are consecutively used by the processing unit 102. Further, at step 312, the count value is incremented when at least two unused prefetched cache lines 107 are consecutively evicted from the data cache 106. Finally, at step 314, the prefetch disabling module 120 disables the prefetching of at least one cache line 107 into the data cache 106 when the count value is greater than zero.

It will be understood by those of skill in the art that the same logical function may be performed by different arrangements of logic gates, or that logic circuits operate using either positive or negative logic signals. Therefore, variations in the arrangement of some of the logic gates described above should not be considered to depart from the scope of the present invention.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A processor, comprising:

a processing unit that executes instructions;

a memory, coupled to the processing unit, that stores data required for executing the instructions;

a data cache, coupled to the processing unit and the memory, that temporarily stores the instruction data in the form of a plurality of cache lines, wherein each cache line includes a memory address and corresponding data prefetched from the memory;

a prefetch engine module, coupled to the processing unit and the data cache, that prefetches the memory address and corresponding data for each cache line from the memory to the data cache; and a prefetch back-off module, coupled to the data cache and the prefetch engine module, that includes:

a control unit that (i) assigns a status bit to a cache line having data newly prefetched into the data cache by the prefetch engine module, (ii) sets the status bit, (iii) resets the status bit when the cache line is used by the processing unit, (iv) identifies cache lines that are used by the processing unit for executing the instructions, (v) and identifies unused cache lines that are evicted from the data cache;

a counter that (i) decrements a count value when the control unit identifies at least two prefetched cache lines that are used consecutively by the processing unit, and (ii) increments the count value when the control unit identifies at least two unused prefetched cache lines that are evicted consecutively from the data cache; and a prefetch disabling module, connected to the counter, that disables prefetching of at least one cache line into the data cache when the count value is greater than zero.

2. The processor of claim 1, wherein the counter further decrements the count value when the prefetch back-off module receives a prefetch request from the processing unit upon occurrence of a cache miss in the data cache.

3. The processor of claim 1, wherein the prefetch engine module comprises a one block look-ahead (OBL) prefetch engine that prefetches data that corresponds to a memory address subsequent to a current memory address when a cache miss has occurred for the current memory address.

4. The processor of claim 1, wherein the prefetch engine module comprises a stride-allocate on miss (AoM) prefetch engine that includes:

a reference pattern table (RPT) for storing details of instructions that encounter a cache miss, and predicting at least one memory address to be prefetched based on the stored details; and an RPT controller, connected to the RPT, that updates the RPT at each instruction.

5. The processor of claim 4, wherein the details include current program addresses of the instructions that encounter a cache miss, corresponding previous and current data addresses for said instructions, and a difference between the current and previous data addresses of said instructions.

6. The processor of claim 1, wherein the processing unit comprises at least one of an arithmetic logic unit (ALU), a branch unit, and a load store unit.

7. A method for controlling prefetching data to a data cache of a processor, wherein the processor includes a processing unit that executes instructions, a memory that stores data required for executing the instructions, the data cache that temporarily stores the instruction data in the form of a plurality of cache lines, a prefetch engine module and a prefetch back-off module, the method comprising:

assigning and setting a status bit to a cache line having newly prefetched data;

resetting the status bit when the cache line is used by the processing unit for executing one of the instructions;

identifying a cache line used by the processing unit for executing one of the instructions;

identifying an unused cache line that has been evicted from the data cache;

decrementing a count value when at least two prefetched cache lines are used consecutively by the processing unit;

incrementing the count value when at least two unused prefetched cache lines have been evicted consecutively from the data cache; and disabling prefetching of at least one cache line when the count value is greater than zero.

8. The method of claim 7, further comprising decrementing the count value when a prefetch request is generated by the processing unit upon occurrence of a data cache miss.

9. The method of claim 7, further comprising prefetching data corresponding to a memory address subsequent to a current memory address when a cache miss has occurred for the current memory address.

10. The method of claim 7, further comprising allocating at least one instruction that encounters a cache miss in a reference pattern table (RPT), storing details of the at least one instruction in the RPT, updating the RPT at each instruction, and predicting at least one memory address to be prefetched from the memory based on the details stored in the RPT.

11. The method of claim 10, wherein the details include a current program address of the at least one instruction, corresponding current and previous data addresses, and a difference between the current and previous data addresses of the at least one instruction.

12. A processor, comprising:

a processing unit that executes instructions;

a memory, connected to the processing unit, that stores data required for executing the instructions;

a data cache, connected to the processing unit and the memory, that temporarily stores the instruction data in the form of a plurality of cache lines, wherein each cache line includes a memory address and corresponding data prefetched from the memory to the data cache;

an one block look-ahead (OBL) prefetch engine that prefetches data that corresponds to a memory address subsequent to a current memory address when a cache miss occurs;

a stride-allocate on miss (AoM) prefetch engine that includes:

a reference pattern table (RPT) for storing details of at least one instruction executed by the processing unit that encounters a cache miss and predicting a memory address to be prefetched based on the stored details; and a RPT controller, connected to the RPT, that allocates the at least one instruction in the RPT that encountered the cache miss, and updates the RPT; and a prefetch back-off module, connected to the data cache, the OBL prefetch engine and the stride-AoM prefetch engine, wherein the prefetch back-off module includes:

a control unit that (i) assigns a status bit to a cache line with newly prefetched data, (ii) sets the status bit, (iii) resets the status bit when the cache line is used by the processing unit for executing one of the instructions, (iv) identifies a prefetched cache line that is used by the processing unit for executing one of the instructions, and (v) identifies an unused cache line that has been evicted from the data cache;

a counter, that decrements a count value when the control unit identifies at least two prefetched cache lines that are consecutively used by the processing unit, and increments the count value when the control unit identifies at least two unused prefetched cache lines that have been evicted consecutively from the data cache; and a prefetch disabling module, connected to the counter, that disables prefetching of data to the data cache when the count value is greater than zero.

13. The processor of claim 12, wherein the counter further decrements the count value when the prefetch back-off module receives a prefetch request from the processing unit upon occurrence of a data cache miss.

14. The processor of claim 12, wherein the details include a current program address of the at least one instruction, corresponding current and previous data addresses, and a difference between the current and previous data addresses.

15. The processor of claim 12, wherein the processing unit comprises at least one of an arithmetic logic unit (ALU), a branch unit and a load store unit.

* * * * *